March 2, 1954  J. E. WEBB ET AL  2,670,559
TROLLING PLUG
Filed March 14, 1950
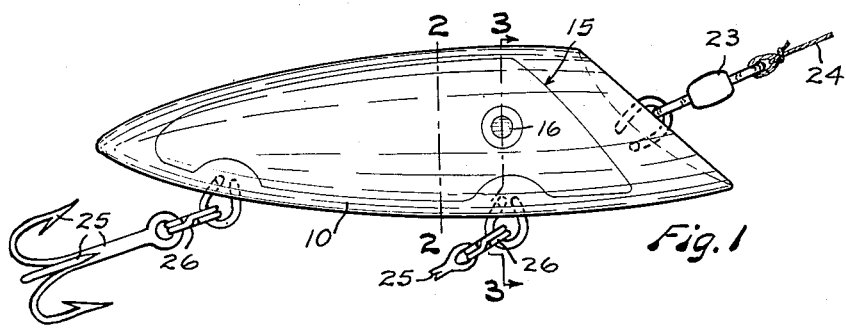
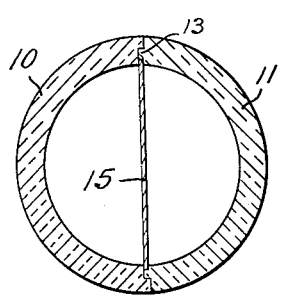
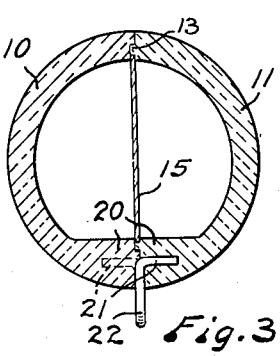
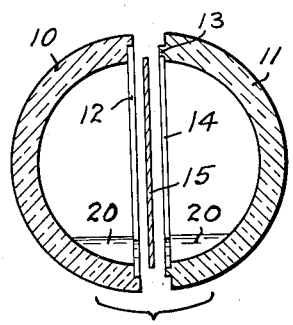
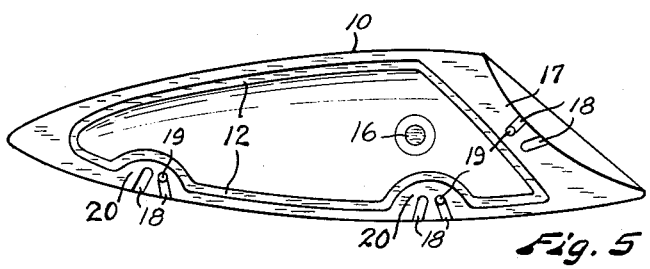
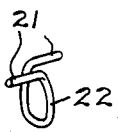
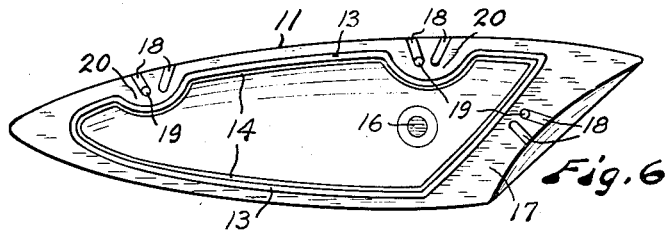
INVENTORS
John E. Webb
William J. Kounkel
BY Fred C. Matheny
ATTORNEY Patented Mar. 2, 1954

2,670,559

UNITED STATES PATENT OFFICE 2,670,559

TROLLING PLUG

John E. Webb and William J. Kounkel,
Seattle, Wash.

Application March 14, 1950, Serial No. 149,504

4 Claims. (Cl. 43—42.33)

This invention relates to trolling plugs for use in fishing and an object of this invention is to provide a trolling plug comprising two concavo-convex light conductive body parts of ring shaped cross section and of at least partially transparent plastic material, said parts having their edge portions united and sealed together, as by coalescence and having within the plug a longitudinally extending normally vertical medial partition member of distinctive visual characteristics and appearance capable of being seen through the plug and which renders the plug attractive and alluring to fish.

Another object of this invention is to provide plastic trolling plugs which may be constructed of substantially clear and substantially transparent plastic material and which may be provided with different color characteristics and with other different visual characteristics by placing within said trolling plugs, at the time they are assembled, longitudinally extending normally vertical medial partition members of different colors and designs.

A further object of the invention is to provide a trolling plug having a multiple part molded body of plastic material and having a plurality of eyelets permanently attached to said body by embedding portions of said eyelets in the body at the time the body parts are assembled and sealed together and leaving other parts of said eyelets exposed and protruding outwardly from the plug body so that hooks, lines and the like may be attached to these outwardly protruding eyelet parts.

Another object of the invention is to provide a trolling plug formed by uniting two or more dish shaped parts of plastic material of predetermined wall thickness to provide a hollow plug body having a sealed internal chamber, whereby a trolling plug having any desired degree of buoyancy can be constructed from non-buoyant plastic material.

Other objects of the invention are to provide a trolling plug formed of plastic material which plug is alluring and attractive in appearance; highly efficient in catching fish; substantial and durable and capable of withstanding high water pressure without change of buoyancy; which is free from external paint and varnish and which will not become dull and worn looking after use; which is quick and life like in its movement in the water and which is simple in construction and not expensive to manufacture.

Other objects of this invention will be apparent from the following description taken in connection with the accompanying drawings.

In the drawings

Figure 1 is a side elevation of a trolling plug constructed in accordance with this invention.

Figs. 2 and 3 are views in cross section of said trolling plug, taken substantially on broken lines 2—2 and 3—3 of Fig. 1 respectivley, and on a larger scale than said Fig. 1.

Fig. 4 is an exploded view in cross section showing the parts of the plug as they may appear before they are assembled and secured together.

Figs. 5 and 6 are plan views showing the inner or adjoining faces of two plug forming parts or halves which, when they are placed face to face and secured together, cooperate to form a trolling plug.

Fig. 7 is a detached view in elevation of a partition member used in the construction of this trolling plug.

Fig. 8 is a fragmentary elevation of a modified form of partition member.

Fig. 9 is a deached perspective view of an eye forming member used in this plug to provide attachment means for hooks, lines, leaders and the like.

Like reference numerals designate like parts throughout the several views.

This trolling plug is made up of two separately molded halves or half shells 10 and 11 of plastic material which are subsequently united together along lines which lie in the medial vertical plane of the plug so that the two parts 10 and 11 form respectively the left and right halves of the plug as shown in Figs. 2, 3 and 4.

Each part 10 and 11 preferably tapers substantially to a point at the rear end and is preferably inclined and of concave external shape at the front end.

Each part 10 and 11 has a concavely recessed inner side and each part is of substantially the shape of a semicylindrical shell or ring cross sectionally considered. The mating edge portions of the two parts 10 and 11, that is the edge portions which are adapted to be sealed together in the process of completing the plug, are provided with mating tongue and groove means which interfit and cooperate to insure correct registration of the two plug forming members and to insure efficient sealing and a water tight seal and which further cooperate to provide a continuous recess for the reception of the marginal portion of a medial partition member 15 of distinctive appearance, as hereinafter described.

The mating tongue and groove means is formed by providing in the edge portion of the plug part 10 an L-shaped groove or rabbet 12 extending continuously around the same adjacent the concave internal wall of said part 10. The inner edge portion of the plug part 11 has a tongue 13 extending continuously around the same and protruding from the face thereof and which is shaped and positioned so that it will fit within the rabbet groove 12 of the other plug forming part 10.

The tongue 13 is not flush with the inside concave wall of the plug part 11 but is offset outwardly a short distance from such inside concave wall to leave in the part 11 a rabbet groove 14 which cooperates with a portion of the rabbet groove 12 in the part 10 to form a continuous groove or recess which serves to receive the marginal portion of the partition member 15. The two grooves 12 and 14 are L-shaped grooves like the grooves provided in the edges of shiplap lumber.

The partition member 15 is of distinctive appearance to make it attractive to fish and said partition member is visible through the plug forming members 10 and 11, which are at least partially transparent so that the partition member 15 can be seen therethrough. Obviously any color or design on the partition member 15 will be blended with and imparted to the plug forming parts 10 and 11 to such an extent as to make the entire plug take on the distinctive visual characteristics of the partition member 15.

A fish like eye member 16 may be depicted on the inner wall of each plug part 10 and 11. This eye 16 can be formed by molding it into the plastic or by painting it on the plastic or by molding the eye outline within the plastic and then applying paint or the like thereto or by attaching to the plastic a separately formed eye part.

Preferably the wall 17 at the front end of each plug member 10 and 11 is relatively thick and strong and has two grooves 18 molded therein. A transverse hole or cavity 19 is provided at the inner end of one groove 18 of each pair. Also each plug forming member 10 and 11 is provided along its lower side with at least one and preferably two thickened portions 20 which also have pairs of grooves 18 formed in their face portions and in which one groove 18 of each pair is provided at its inner end with a hole or cavity 19. The grooves 18 and cavities 19 are adapted to receive the oppositely protruding inner end portions 21 of eye members 22 which are adapted to form loops on the exterior of the plug.

A swivel 23 may be connected with the eye member 22 in the forward end portion of the plug and a line or leader 24 may be connected with this swivel 23. Hooks 25 may be connected, as by split rings 26, with the loop forming eye members which are provided along the lower side of the plug.

The loop forming eye members 21, 22 are installed at the time the two halves 10 and 11 of the plug are assembled and sealed together. These two halves or parts 10 and 11 of the plug are formed of plastic material which can be softened by the application to the surface thereof of a solvent. When a proper solvent is applied to the edges of the two parts of the plug these two parts can be held in firm contact with each other for a short time and a coalescence will occur and the two contacting parts will be united and will become substantially like a single piece and a sealed chamber will be provided within the plug. The partition 15 is inserted before the two plug forming parts 10 and 11 are thus sealed together and will be permanently enclosed in the plug. The marginal portion of the partition is entirely within the outline of the tongue member 13 and lies within the shallow groove formed by the cooperation of rabbet grooves 12 and 14 and tongue member 13. Thus this partition does not interfere with the efficient sealing together of the interfitting tongue and groove parts of the two members 10 and 11.

The partition member 27, shown in Fig. 8, is preferably made of metal foil or thin metal which has been passed between rollers to form it and give it an appearance simulating the scales of a fish. This member 27 can be of bright metal or it can be colored as desired.

It has been found that if the parts 10 and 11 are made of fluorescent plastic the plug will have better light characteristics when used in subdued light such as on dark days or at night or at depths too great for sun light to penetrate effectively.

The parts 10 and 11 can be made from substantially clear plastic material or they can be colored as desired but in either case they are preferably transparent enough so that the distinctive visual characteristics of the medial partition member can be observed therethrough. For instance if the plug members 10 and 11 are formed of colored plastic and a bright metal or foil partition plate having scale designs thereon, such as the plate 27 of Fig. 8, is used this partition plate can still be seen through the colored plastic walls of the plug.

The use of the partition member forms or provides an inexpensive and efficient means of imparting color characteristics or distinctive visual characteristics to the plug.

The foregoing description and accompanying drawings clearly disclose preferred embodiments of this invention but it will be understood that this disclosure is merely illustrative and that changes in this trolling plug may be made within the scope and spirit of the following claims.

I claim:

1. A trolling plug comprising two relatively long dish shaped plug forming members of concavo-convex cross sectional shape, one of said plug forming members having a continuous L shaped rabbet groove in the edge thereof adjacent its inside surface and the other plug forming member having on the edge thereof a continuous tongue positioned to fit within said rabbet groove when the two plug forming members are disposed in face to face relation, said tongue being spaced outwardly from the inside surface of said other plug forming member, whereby a partition receiving groove is provided inwardly from said tongue; and a partition supported within said partition receiving groove, said partition having distinctive visual characteristics which can be seen through said plug forming members.

2. A trolling plug comprising two half shells having mating edge portions which are adapted to be positioned face to face and sealed together so that the two half shells provide a hollow water tight plug body, the mating edge portions of said half shells having correspondingly positioned pairs of grooves therein extending from the exterior toward the interior of said edge portions and said edge portions having transversely extending cavities formed at the inner end of at least one groove of each pair; and loop forming eye members having portions positioned in said grooves and having oppositely directed out turned portions embedded in said cavities and having loop forming portions extending outwardly from the plug body formed by said half shells.

3. A trolling plug comprising a hollow body formed of substantially similar complementary dish shaped registering longitudinally extending half shells of at least partially transparent plastic material and provided with mating edge portions adapted to fit one against another, at least one of said mating edge portions having a partition receiving groove in its inner edge; and a medial partition of distinctive visual characteristics having peripheral portions thereof disposed within said groove, said half shells being sealed together outwardly from said groove thereby completely enclosing the partition within the plug body and providing a water tight construction.

4. A trolling plug comprising a hollow body formed of substantially similar complementary dish shaped registering longitudinally extending half shells of at least partially transparent plastic material and provided with mating edge portions adapted to fit one against another, at least one of said mating edge portions having a partition receiving groove in its inner edge; and a medial partition member of bright and shiny metal pressed to simulate the scales of a fish and having peripheral portions thereof engaged within said groove, said half shells being sealed together outwardly from said groove completely enclosing said partition member within the plug body and providing a water tight plug body, the simulated fish scales on the partition being visible from the exterior of the plug.

JOHN E. WEBB.
WILLIAM J. KOUNKEL.

References Cited in the file of this patent

UNITED STATES PATENTS

| Number | Name | Date |
| --- | --- | --- |
| 1,881,823 | McKenzie | Oct. 11, 1932 |
| 2,008,437 | DeWitt | July 16, 1935 |
| 2,187,609 | Larson | Jan. 16, 1940 |
| 2,198,043 | Scogland et al. | Apr. 23, 1940 |
| 2,224,389 | Haselwood | Dec. 10, 1940 |
| 2,311,985 | Heddon | Feb. 23, 1943 |

FOREIGN PATENTS

| Number | Country | Date |
| --- | --- | --- |
| 886,107 | France | Oct. 6, 1943 |